Figure 1:
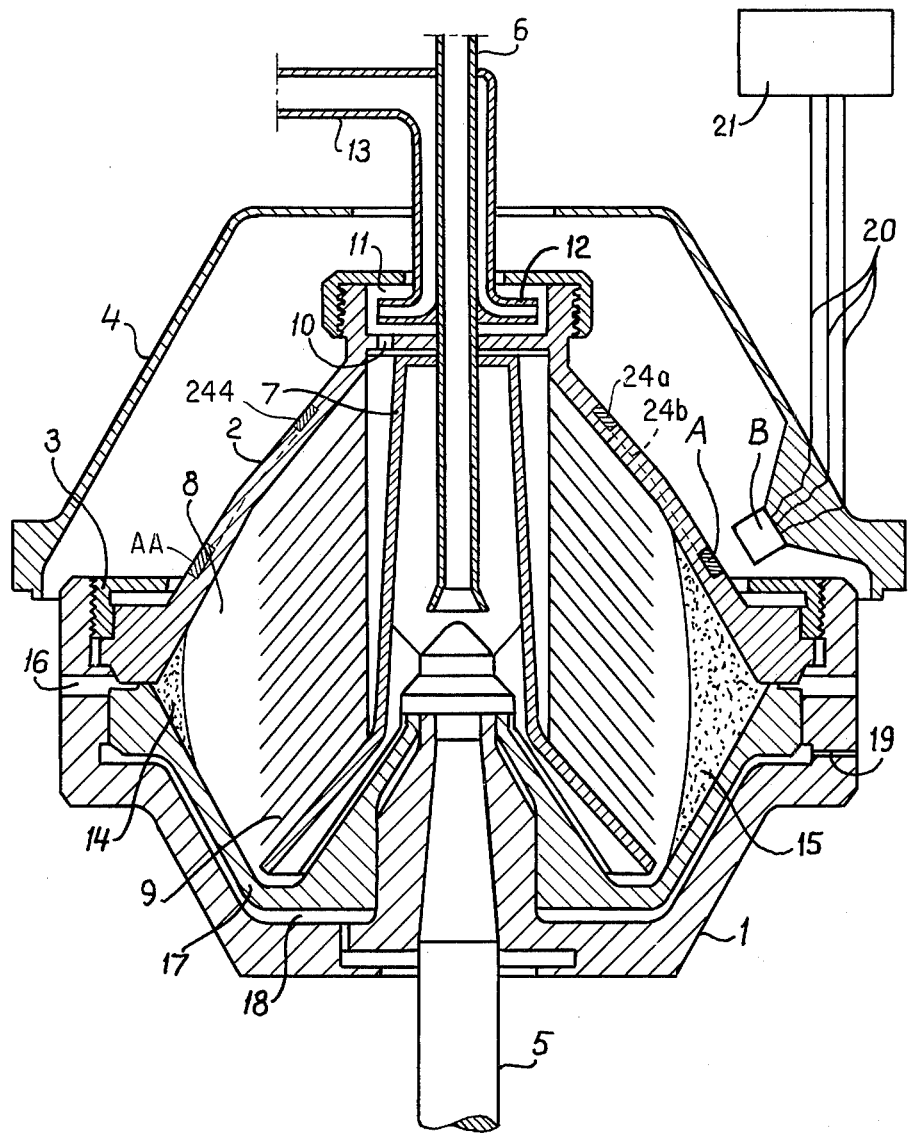

United States Patent [19]
Jonsson, deceased et al.

[11] 3,986,663
[45] Oct. 19, 1976

[54] CENTRIFUGAL SEPARATOR WITH SENSING MEANS

[75] Inventors: Rolf A. Jonsson, deceased, late of Tumba, Sweden; by Sture Aalsaeter, administrator, Huddinge, Sweden

[73] Assignee: Alfa-Laval AB, Tumba, Sweden

[22] Filed: Dec. 28, 1973

[21] Appl. No.: 429,346

[30] Foreign Application Priority Data
Jan. 8, 1973  Sweden .............................. 7300182

[52] U.S. Cl. ................................................ 233/20 A
[51] Int. Cl.² .......................................... B04B 11/04
[58] Field of Search ............. 233/19 R, 19 A, 20 R, 233/20 A

[56] References Cited
UNITED STATES PATENTS

| | | |
|---|---|---|
| 3,189,268 | 6/1965 | Nilsson .............................. 233/20 R |
| 3,261,546 | 7/1966 | Gruver .............................. 233/20 R |
| 3,593,915 | 7/1971 | Steinacker ........................ 233/20 R |

*Primary Examiner*—George H. Krizmanich
*Attorney, Agent, or Firm*—Cyrus S. Hapgood

[57] ABSTRACT

A first unit rotating with the centrifugal rotor forms an electric resonance circuit having at least one variable oscillation property; and a sensing member rotating with the rotor is arranged to sense a displacement of an interface formed between two media undergoing centrifugal separation in the rotor, the sensing member acting to change the variable oscillation property of the resonance circuit in response to a sensed displacement. A second unit separate from the rotor comprises means for inductively transferring a signal to the resonance circuit and also includes means for sensing a change of the load by the resonance circuit on the signal transferring means in response to a change of the variable oscillation property of the resonance circuit.

15 Claims, 4 Drawing Figures

CENTRIFUGAL SEPARATOR WITH SENSING MEANS

The present invention relates to an arrangement in connection with centrifugal separators for sensing, during operation, a displacement of an interface formed between two media within the centrifuge rotor.

In the 1930's a method was proposed for sensing electrically, in a centrifugal separator, when so much sludge has been separated therein from a sludge containing liquid that the centrifuge rotor must be emptied. This prior method resides in conducting an electric current through a resistor placed in a suitable place within the separating chamber of the centrifuge rotor, so that heat developed in the resistor at the beginning (i.e., before a substantial amount of sludge has been separated within the centrifuge rotor) is removed by the liquid flowing through the centrifuge rotor but thereafter is accumulated therein when a certain amount of sludge has been separated. The separated sludge thus prevents an effective cooling of the resistor, thereby causing a temperature rise in the resistor. This led to a change of the resistance for the electric current, which could be registered and used as an indication that the centifuge rotor must be emptied of sludge.

Other methods have subsequently been suggested for electrical sensing of a displacement of an interface formed between two media in a centrifugal separator. For instance, it has been attempted to sense by means of a sensing member, situated in a suitable place within the centrifuge rotor, the dielectric constant or some other property of the medium being in contact with the sensing member. In this way, it would be possible to sense when an interface between two media, for instance oil and water, reaches a certain level within the centrifuge rotor.

However, neither the above-mentioned nor other proposed methods of sensing electrically a displacement of an interface between two media in the centrifugal rotor have led to any practically usable arrangement for this purpose. Instead, another method also proposed in the 1930's, has been adopted, for instance for sensing sludge. This prior method resides in creating a liquid flow in the radially outer part of the separating chamber of the centrifuge rotor, it being sensed when sludge separated in the separating chamber prevents this flow of liquid. However, the last mentioned method, in spite of the fact that it has been practically used, has a number of disadvantages. For example, it necessitates a substantial complication of the centrifugal rotor construction. For sensing displacements of an interface between oil and water, for instance, comparisons are still made between pressures which are sensed in different outlets from the separating chamber of the centrifuge rotor.

The primary reason why previously proposed methods of sensing such interface displacement electrically have not been practically realizable is believed to be the difficulty of solving the problem of transferring information of an indication from a sensing member, rotating together with the centrifuge rotor, to a stationary apparatus which may be intended automatically to initiate or perform an operation in response to the indication.

An object of the present invention is to provide a sensing arrangement by which this information transfer problem is solved in a practically realizable way.

This object is fulfilled according to the invention by an arrangement characterized by a first unit forming an electric resonance circuit rotating together with the centrifuge rotor and having at least one variable oscillation property, a sensing member rotating together with the centrifuge rotor being arranged to sense a displacement of the said interface and to change, upon a sensed displacement, the variable oscillation property of the resonance circuit, and a second unit separate from the centrifuge rotor and comprising equipment for inductively transferring a signal to the resonance circuit and means for sensing a change of the load by the resonance circuit on this equipment as a consequence of a change of the variable oscillation property of the resonance circuit.

The invention is based on the concept that the sensing first unit, which rotates together with the centrifuge rotor, shall be entirely passive in that it shall not emit a signal by itself to the second unit separate from the rotor due to a sensing. Instead, there shall be sensed in the second unit changes of the load thereon by the first unit as a consequence of changes of an oscillation property (oscillation characteristic) of the resonance circuit in the first unit, which latter changes have been caused by the sensing member. It will thus be possible to transfer to the second unit, separate from the centrifuge rotor, information about very small variations of a magnitude sensible on the centrifuge rotor, which variations have taken place owing to a displacement of an interface between two media within the centrifuge rotor. Thus, the invention makes it possible for the first time, in connection with sludge sensing, to use a small temperature change at the centrifuge rotor, which will arise automatically, little by little, when sludge is separated therein. This temperature change is too small to be certainly sensed by means of sensing methods proposed heretofore.

Within the scope of the invention, the sensing member rotating together with the centrifuge rotor may be of different kinds. It may be a separate element arranged to influence, in dependence upon a sensed value of some physical magnitude, one or more of the components which form the said resonance circuit, such that the oscillation properties of the circuit are changed. If possible, however, one of said components preferably is utilized as the sensing member of the arrangement.

The load on the second unit separate from the centrifuge rotor may be changed in different ways depending upon which oscillation property of the resonance circuit is variable by means of the sensing member. Preferably, the resistance is maintained substantially unchanged in the resonance circuit, while the capacitance is allowed to vary in response to changed of some physical magnitude that is sensed by the sensing member. If the arrangement is to be used for sensing temperature changes in the centrifuge rotor or its content, there may be included in the resonance circuit a capacitor constituting the said sensing member, the capacitance of which varies with the temperature in a predetermined way. In this way, the natural frequency of the resonance circuit may be pre-set so that a striking change of the load on the second unit separate from the centrifuge rotor is obtained when a predetermined temperature is sensed on the centrifuge rotor by the sensing member (i.e., the capacitor), namely, at the moment when the natural frequency of the resonance circuit has adopted a value that corresponds to the frequency of the signal that is emitted by the unit separate from the centrifuge rotor. Not until the resonance circuit in the first unit resonates with the energy emitting circuit in the second unit does it absorb a substantial amount of energy from the latter.

If desired, the energy emitting second unit may comprise means for varying the frequency of the signal that is emitted. For instance, the frequency may be caused to sweep between two values. In this way, it is possible substantially continuously to follow changes of the value of the physical magnitude that is sensed in the centrifuge rotor. Then it is sensed at the energy emitting second unit which frequency is prevailing at each moment when a striking change of the load on this unit is registered.

Another possibility of performing the sensing is to allow the resistance in the resonance circuit on the centrifuge rotor to vary in response to the value of the physical magnitude sensed on the centrifuge rotor, whereas the natural frequency of the circuit is maintained constant. In this case, changes of the value of the physical magnitude may be directly sensed at the energy emitting second unit as corresponding changes of the load thereon. The sensed changes of this load then correspond to changes of the damping effect by the variable resistance on the oscillations in the resonance circuit, as a consequence of sensed changes of the value of the physical magnitude. The frequency of the signal emitted from the second unit in this case is maintained substantially constant, equal to the natural frequency of the resonance circuit.

Within the scope of the invention, changes of the load on the unit separate from the centrifuge rotor may be sensed in different ways. One possibility is to sense a change of the amplitude of the oscillations created in this unit. Another possibility is to sense a change of the energy consumption by the means creating the oscillations in the unit.

Figure 2:
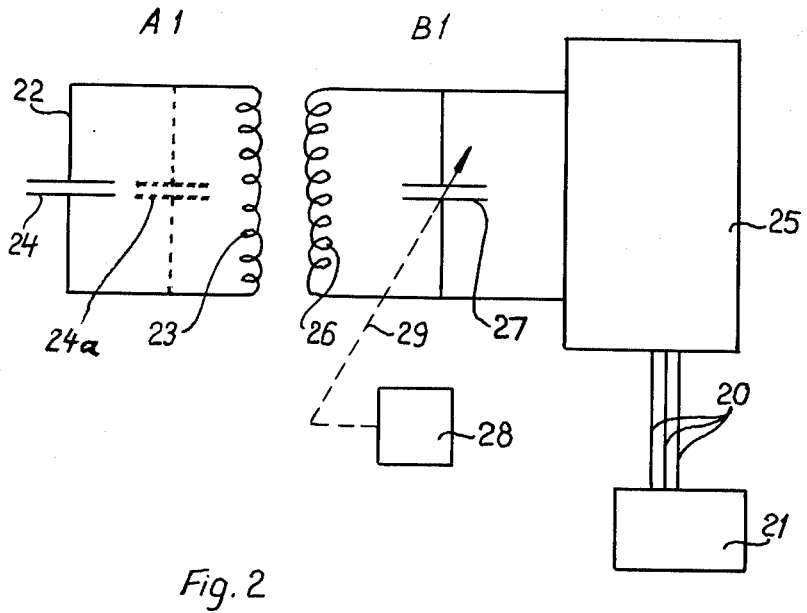
Figure 3:
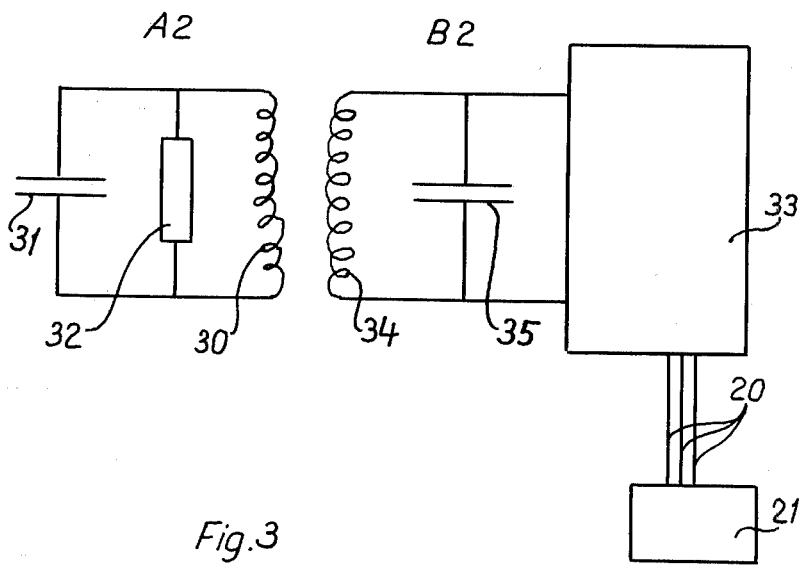
Figure 4:
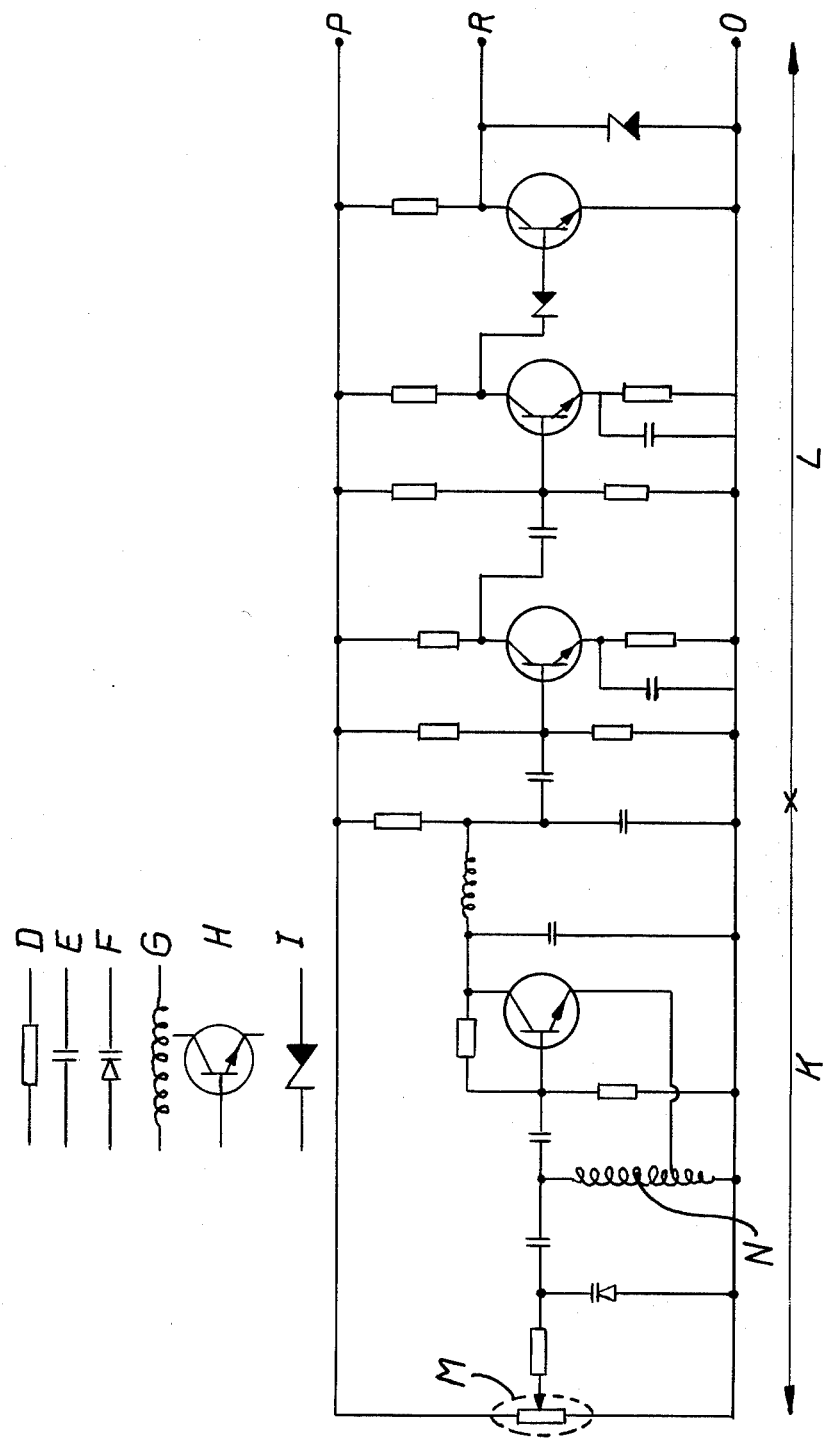

The invention is described below with reference to the accompanying drawings, in which:

FIG. 1 is a vertical sectional view of a centrifugal separator provided with an arrangement according to the invention, FIGS. 2 and 3 are schematic views showing the main principle of two alternative embodiments of the arrangement according to the invention, and FIG. 4 is a circuit diagram of a part of the arrangement according to FIG. 2.

In FIG. 1, a centrifuge rotor comprises a lower part 1 and an upper part 2. The parts 1 and 2 are held together by means of a lock ring 3. The centrifuge rotor, which is covered by a protective cover 4, is supported by a driving shaft 5. Through a stationary inlet conduit 6, a mixture of media which are to be separated within the rotor is conducted to the center of the rotor. By a conical distributor 7, the mixture is directed from the center of the rotor into the lower part of its separating chamber 8. During the separating operation, a separated light component of the mixture flows radially inwards from this chamber and between the conical discs in a conventional disc set 9 and thence through an opening 10 into a chamber 11. From this chamber 11 the separated light component is removed from the rotor by a paring means 12 through a conduit 13. Separated heavy component of the mixture remains in the separating chamber 8 and forms a gradually growing layer in the radially outer part thereof. To the left in FIG. 1 there is shown a thin layer 14, illustrating that a separating operation has just been started, whereas to the right in FIG. 1 there is shown a thick layer 15, illustrating that the separating operation has proceeded for a substantial period of time.

The lower rotor part 1 has a number of openings 16 around its periphery. These are outlet openings for the heavy mixture component separated within the rotor. Before a certain quantity of heavy component has been separated in the separating chamber 8, these outlet openings 16 are closed by a valve member 17 axially movable within the centrifuge rotor. The valve member 17, which forms the bottom of the separating chamber 8, is arranged to be held in close abutment around its periphery against the underneath side of the upper rotor part 2 by means of a liquid pressure. This pressure is created by a continuous supply of liquid to an interspace 18 beneath the valve member 17 between the latter and the lower rotor part 1. When a certain quantity of heavy component has been separated in the centrifuge rotor (i.e., when the said layer 14, 15 has reached a certain thickness), the outlet openings 16 are uncovered for a short period of time. This uncovering is obtained by brief interruption of the liquid flow to the interspace 18. The liquid that has arrived in the interspace 18 then leaves through throttled openings 19 at the periphery of the rotor part 1, whereby the pressure from the liquid situated in the separating chamber 18 forces the valve member 17 downwards, so that a part of the rotor content is thrown out through openings 16. When the flow of liquid to the interspace 18 is reestablished, the valve member 17 is pressed back to sealing engagement with the rotor part 2, so that the outlet openings 16 are closed.

The present invention relates to an arrangement for sensing when the said layer of separated heavy component of the mixture has reached a predetermined thickness in the separating chamber 8, so that the rotor periphery outlets 16 are to be opened. In the following, one embodiment of an arrangement of this kind is described, it being assumed that the separated heavy component is constituted by sludge or solid particles. The centrifuge rotor then will be influenced in the following manner as a consequence of a gradual accumulation of sludge in the separating chamber 8.

When the centrifuge rotor rotates, heat is generated owing to friction between the rotor and the surrounding air, which heat is conducted inwards through the rotor wall towards the separating chamber 8. The heat is further transferred from the rotor wall to the medium that is situated in the separating chamber. Before any sludge has been separated in the separating chamber, or as long as the sludge quantity is relatively small, the greater part of the rotor wall inside is contacted by liquid that subsequently leaves the separating chamber. The friction heat generated on the outside of the rotor wall is thus led away with the liquid leaving the rotor, whereby the temperature of the rotor wall is maintained substantially constant. However, when the sludge layer in the separating chamber 8 grows thicker, it forms an insulation between a part of the rotor wall and the liquid flowing through the rotor, whereby the removal of heat from this part of the rotor wall will be less effective. This results in a temperature increase of this part of the rotor wall and the sludge separated in the separating chamber. It is this temperature increase that is to be sensed by means of the arrangement according to the invention. (If the medium in the centrifuge rotor is sufficiently hot, there is instead a heat flow from this medium via the rotor wall to the atmosphere surrounding the centrifuge rotor. In this case the insulation by sludge, separated in the centrifuge rotor, will cause a temperature decrease of the radially outer parts of the centrifuge rotor. The arrangement according to the invention then can be used for sensing this temperature decrease.)

The arrangement according to the invention comprises a first unit A firmly connected with the rotor part 2, and a second unit B fastened on the in ide of the protecting cover 4 so that the unit A will pass exactly opposite to unit B when the centrifuge rotor is in rotation. By means of electric lines 20, the unit B is connected to an apparatus 21 which is arranged to perform three functions, namely (1) to provide the unit B with necessary energy, (2) to sense a varying load on the unit B, and (3) to supply a signal to the control unit of the centrifugal separator for initiating a sludge discharge operation when a certain quantity of sludge has been separated in the separating chamber.

The units A and B in FIG. 1 are shown at A1 and B1, respectively, in the FIG. 2 embodiment and at A1 and B2, respectively, in the FIG. 3 embodiment.

In FIG. 2, the unit A1 connected to the centrifuge rotor consists of members which form together a passive oscillatory circuit. These members are a cable 22, an inductor 23 and a capacitor 24. The capacitor 24 constitutes the sensing member in the rotor wall and is of a kind the capacitance of which is strongly dependent on the temperature to which the capacitor is subjected. The natural frequency of the oscillatory circuit is thus dependent on the temperature to which the capacitor 24 is subjected. The unit B1, which is fastened to the inside of the protective cover 4, comprises an oxcillator 25 with frequency determining elements in the form of an inductor 26 and a capacitor 27. By means of conventional equipment 28, the capacitance of the capacitor 27 may be caused to vary, automatically or manually, between two predetermined values. The connection between the equipment 28 and the capacitor 27 is illustrated in the drawing by a dotted line 29. By means of cables 20, the oscillator 25 is connected to the apparatus 21 (FIG. 1) which among other things supplies energy to the oscillator.

In the operation of the arrangement according to FIG. 2, the capacitance of the capacitor 27 in unit B1 is caused to vary slowly in a stepless way, by means of the equipment 28, from a certain maximum value to a certain minimum value and to restart thereafter from the maximum value. In this way the frequency of the oscillation in the inductor 26, caused by the oscillator 25, is caused to sweep slowly between two predetermined values. The unit A1 by its construction has a certain natural frequency, which is changed, however, in dependence upon the temperature to which the capacitor 24 is subject, i.e., in dependence upon how much sludge has been separated in the separating chamber 8 (FIG. 1). The frequency field over which the frequency sweeping takes place in the unit B1 is chosen so that it comprises the frequency values which the natural frequency of the unit A1 will adopt during the temperature (sludge) sensing operation in question.

As long as the natural frequency of the circuit in the unit A1 differs from the frequency of the oscillation in the inductor 26 at the moment, the circuit cannot be caused to oscillate to any substantial extent by the unit B1, when the two units A1 and B1 are situated opposite to each other. The unit A1 is no substantial load on the unit B1 during this period. However, at the very moment when the oscillation in the inductor 26 of the unit B1 has a frequency that corresponds to the natural frequency of the circuit in the unit A1, the latter circuit is caused to oscillate when it passes the unit B1; in other words, it will be made to resonate with the circuit in the unit B1. This means that it is suddenly sensed by the unit B1 as a substantial load (i.e., it gets from the unit B1 the energy that is necessary for its oscillation). At the moment when a load increase can be registered in the unit B1, the frequency of the oscillation prevailing in the unit B1 corresponds to a predetermined temperature at the capacitor 24 in the unit A1, i.e., in the rotor wall.

By letting the frequency of the oscillation in the unit B1 sweep in the described manner repeatedly between two predetermined values, it is possible to follow temperature changes in the rotor wall at the unit A in FIG. 1 and, thus, when a predetermined temperature (frequency) is achieved, or a predetermined temperature (frequency) change has occurred, manually or automatically initiate a sludge discharge operation. Normally it is of little interest, however, to follow continuously temperature changes in the rotor wall. Usually it is sufficient to obtain information about when a certain temperature has been achieved or a certain temperature change has occurred. Therefore, the equipment 28 may be so constructed that a certain constant value of the capacitance of the capacitor 27 can be set, corresponding to the temperature at the capacitor 24 (i.e., in the rotor wall) at which a sludge discharge operation should be performed. As a trigger signal for automatic initiation of the sludge discharge operation, a signal can then be used coming from means arranged to sense a load increase by the unit A1 on the unit B1. A load increase of this kind will not occur until it is time to initiate a sludge discharge operation.

A load increase in the unit B1 may be sensed in different ways. One possibility is to sense a decrease of the amplitude of the oscillations in the inductor 26 of the unit B1, caused by the load increase. Another possibility is to sense a change of the energy consumption of the oscillator 25. In the embodiment in FIG. 2, a load increase in the unit B1 is intended to be sensed by means of equipment included in the apparatus 21.

The drawing shows no means for indicating the frequency of the oscillation in the unit B1. If desired, an indicator of this kind may be connected at any suitable place, for instance, connected to the equipment 28. As a rule, information about the magnitude of the frequency is desired only when a change of the load on the unit B1 occurs. In the case where the frequency in the unit B1 is caused to sweep between two values, this information may be achieved, for instance, in the way that the said equipment for sensing a change of the load on the unit B1 is arranged to open a connection to a frequency (temperature) indicator only when a load increase is registered. In the embodiment according to FIG. 1, no frequency (temperature) indicator is required. The apparatus 21 is instead arranged to emit a signal to the control unit of the centrifugal separator, when a certain temperature change has been registered in the centrifuge rotor, thereby initiating a sludge discharge operation.

The frequency (temperature) reference value which must be set in a frequency indicator or the equipment 28, if the frequency of the oscillations in the unit B1 should be constant, may be fixed empirically. Also an automatic setting (control) may be provided by connecting the frequency indicator or the equipment 28 to suitable means such as an equipment which continuously senses either the temperature of the mixture of components supplied to the centrifuge rotor for separation, or the temperature in the part of the rotor wall that is not covered by sludge separated in the separating chamber. An equipment of this kind may comprise two units of the same kind as the previously described units A and B, the unit of the equipment rotating with the rotor being mounted in the rotor wall radially inside the unit A in FIG. 1 at a place to which the interface between liquid and separated sludge never reaches. Two units A1 of the same kind may be fastened to the rotor in a way such that the inductors 23 of the respective units A1 are spaced circumferentially of the rotor, but still situated at the same distance from the axis of rotation of the rotor, so that they may cooperate during the rotation of the rotor with one and the same inductor in one single stationary unit corresponding to the unit B1. The temperature sensing member (e.g., the capacitor 24) in one of the said units A1 is then placed closer to the rotor axis than the corresponding sensing member in the other unit A1. The common stationary unit must then be provided with means for selectively receiving and comparing information obtained during rotation of the rotor regarding the temperatures sensed by the two units A1.

A further possible arrangement for an automatically performed adjustment of a reference value, in response to temperature changes of the liquid mixture, supplied to the centrifuge rotor, is the following: In an embodiment of the invention according to FIG. 1, a further capacitor may be connected in parallel, or in series, with the capacitor 24 in the unit A1. In FIG. 2 a further capacitor 24a of this kind, connected in parallel, is illustrated by dotted lines. This further capacitor 24a may be situated in the centrifuge rotor at a place where it is constantly influenced by the temperature of the liquid mixture supplied to the rotor, i.e., it may be situated at such a radial distance inside the capacitor 24 that it will not be substantially influenced by a temperature change caused by a certain quantity of sludge having been separated in the centrifuge rotor. The capacitor 24a is of a kind having a temperature/capacitance characteristic such that if both of the capacitors 24 and 24a are subjected to exactly the same temperature change, then the resulting capacitance of the resonance circuit of the unit A1 will remain unchanged. In other words, if for instance the capacitor 24 has a characteristic such that its capacitance will increase as a consequence of a certain temperature change, then the capacitance 24a should have a characteristic such that its capacitance will decrease to the same extend for the same temperature change, or vice versa. This means that if the temperature of the liquid mixture supplied to the centrifuge rotor varies, then the natural frequency of the resonance circuit of the unit A1 will not be influenced, since both of the capacitors are subjected to these temperature variations. Not until a temperature change of a certain magnitude is sensed only by the capacitor 24, i.e., when a certain quantity of sludge has been separated in the centrifuge rotor and has caused a temperature change of this kind only around the capacitor 24, does the natural frequency of the resonance circuit of the unit A1 change, which may be sensed in the unit B1.

The diagram of FIG. 3 illustrates another embodiment of the arrangement according to the invention for sensing temperature changes in the rotor wall or in sludge separated inside this wall. This embodiment comprises two units A2 and B2. The unit A2 consists of members which together form a passive oscillatory circuit. As in the embodiment according to FIG. 2, there are also an inductor 30 and a capacitor 31. In FIG. 3, however, there is also a particular resistor 32 connnected in parallel with the capacitor and the inductor. The resistor 32 in this embodiment constitutes the temperature sensing member and is therefore of a kind the resistance of which varies in a predetermined way with the temperature to which it is subjected. Differing from the capacitor 24 in FIG. 2, the capacitor 31 in FIG. 3 is of a kind the capacitance of which is substantially constant independent of the temperature to which it is subjected. However, owing to the variable resistance of the resistor 32, the amplitude of the oscillations which may be generated in the oscillatory circuit of the unit A2 will be dependent upon (i.e., stand in a certain relation to) the temperature to which the resistor 32 is subjected.

The unit B2 comprises an oscillator 33 with an oscillatory circuit including an inductor 34 and a capacitor 35. For its energy supply, the oscillator 33 is connected to the apparatus 21 (FIG. 1) which contains, as in the embodiment according to FIG. 2, equipment for sensing changes of the load on the unit B2. Load changes of this kind are sensed in this case as changes of the amplitude of the oscillations which are generated in the unit B2. The capacitor 35 is of a kind the capacitance of which is maintained constant. The oscillatory circuit is thus caused to oscillate by the oscillator 33 with a constant frequency.

In the operation of the arrangement according to FIG. 3, the frequency at which the oscillator 33 causes the oscillatory circuit of the unit B2 to oscillate is set so that it corresponds to the natural frequency of the oscillatory circuit in the unit A2. (This natural frequency, as previously mentioned, is substantially independent of temperature changes occurring around the unit A2 in the rotor wall.) The oscillatory circuit in the unit A2 will then be caused to oscillate by and constitute a load on the unit B2. The magnitude of the load depends on the energy loss that is absorbed by the unit A2, and mainly by the resistor 32 therein. Upon a change of the resistance of the resistor 32, caused by a change of the temperature to which this resistor 32 is subjected, the load on the oscillator 33 in the unit B2 is thus changed. This load change is sensed by checking the amplitude of the oscillations in the oscillator 33, a certain oscillation amplitude corresponding to a certain value of the resistance by the resistor 32, i.e., a predetermined value of the temperature to which the resistor 32 is subjected. The amplitude sensing equipment included in the apparatus 21 may therefore be constructed in a way such that it can show directly the temperature which prevails in the rotor wall at the unit A2.

As previously mentioned, FIGS. 2 and 3 show only the main principles of an arrangement according to the invention. Within the scope of these main principles, the arrangement may be changed in many different ways by a person skilled in the art.

In the unit A1 or A2, the sensing member may be formed in many different ways depending upon how the interface between two media in the centrifuge rotor is to be sensed, and depending upon how the resonance circuit in the unit A1 or A2 is to be influenced. The sensing member may be arranged so that, in response to a sensed value of some physical magnitude in the rotor or the media therein, it influences any (one or more) of the components included in the unit A1 or A2. If a capacitor included in the resonance circuit is intended to constitute the sensing member, and the capacitance thereof it to be influenced, the medium within the centrifuge rotor may be allowed to enter the interspace between the plates of the capacitor. Also the inductance of an inductor may be influenced by letting the medium in the centrifuge rotor flow freely between the windings of the inductor. If temperature changes in the centrifuge rotor or its content are to be sensed, it is not necessary to sense the automatically occurring temperature changes, such as described above. Instead, heat may be supplied in a suitable way by external means, for instance, to a part of the rotor wall, the unit A (FIG. 1) being arranged to sense when this supply of heat causes a temperature rise in the rotor wall owing to the fact that a heavy component of the mixture, supplied to the rotor, has been separated in the separating chamber and prevents an effective leading away of the heat.

Also the unit B1 or B2 may be formed in many different ways by a person skilled in the art of electronics. FIG. 4 shows an example of a circuit diagram for a unit B1, there being in FIG. 4 a list of the different types of the components included in the circuit diagram. D stands for a resistor, E for a capacitor, F for a varactor, G for an inductor, H for a transistor, and I for a Zener-diode. In the circuit diagram, K stands for oscillator, and L for amplifier.

In the circuit diagram of FIG. 4, which needs no detailed description here, a variable resistor M corresponds to the equipment 28 in FIG. 2, and an inductor N corresponds to the inductor 26 in FIG. 2. O and P designate the connection points for a current source, and R designates one of the connecting points (O constitutes the other one) for a control equipment of a suitable kind.

The arrangement according to FIG. 4 operates in the following manner: By means of energy from a direct current source connected at O and P, an oscillation is generated having a certain frequency, which can be set by means of the variable resistor M. The inductor 23 (FIG. 2) is arranged to pass the inductor 26, i.e., the inductor N in FIG. 4, once for each turn of the centrifuge rotor. As long as the natural frequency of the circuit A1 differs from the frequency of the oscillation in the inductor N, the oscillatory circuit including the inductor N is not influenced. However, when the natural frequency of the circuit A1 corresponds to the frequency in the inductor N, resonance is established between the circuits in the units A1 and B1, when the inductor 23 passes the inductor N. In the arrangement in FIG. 4, this causes a positive pulse at the connection point R. This pulse may be used in any suitable way, as for causing a lamp to give light or for automatically initiating a sludge discharge operation.

Referring back to FIG. 1, the further sensing capacitor 24a previously mentioned is shown with a connection 24b to the resonance circuit and is located radially inside the sensing member (capacitor) of the unit A. Also, FIG. 1 shows at AA the previously mentioned additional unit mounted on the rotor and similar to the first unit A, these two units being spaced from each other circumferentially of the rotor and each coacting with the unit B. The sensing member 244 of the additional unit AA is shown at a shorter distance from the rotor axis than the sensing member at A.

I claim:

1. In combination with a centrifugal separator including a rotor having a separating chamber for receiving a mixture of two media to be separated, the rotor being operable to form an interface between the two media undergoing separation in said chamber, an arrangement for sensing a displacement of said interface during operation of the rotor, said arrangement comprising a first unit forming an electric resonance circuit rotating with the rotor and having at least one variable oscillation property, said unit including a sensing member rotating with the rotor and arranged to sense a displacement of said interface and to change said variable oscillation property of the resonance circuit in response to a said displacement, and a second unit separate from the rotor and including means for inductively transferring a signal to the resonance circuit, said second unit also including means for sensing a change of the load by the resonance circuit on said signal transferring means in response to a change of the variable oscillation property of the resonance circuit.

2. The combination of claim 1, in which said sensing means of the second unit include means operable to sense a change in the energy consumption by said signal transferring means.

3. The combination of claim 1, in which said sensing means of the second unit include means operable to sense a change in the amplitude of the oscillations in said signal transferring means.

4. The combination of claim 1, in which said sensing member of the first unit is a component of said resonance circuit.

5. The combination of claim 1, in which said sensing member of the first unit includes an elements operable to change the natural frequency of the resonance circuit.

6. The combination of claim 1, in which said sensing member of the first unit is a temperature sensing member.

7. The combination of claim 1, in which said sensing member of the first unit is located in the rotor wall apart from the separating chamber.

8. The combination of claim 7, in which said sensing member is located on the outside of the rotor wall.

9. The combination of claim 1, in which said sensing member of the first unit is a capacitor.

10. The combination of claim 9, in which said capacitor is of the kind wherein the capacitance varies with the temperature.

11. The combination of claim 1, in which said sensing member of the first unit is an electric resistor.

12. The combination of claim 1, in which said second unit includes means for varying the frequency of said signal.

13. The combination of claim 12, in which said frequency varying means include means for automatically causing the frequency to sweep between two values.

14. The combination of claim 9, comprising also a further sensing capacitor connected to the resonance circuit and located radially inside said sensing member in the rotor, the two capacitors having complementing characteristics such that, upon a change of a physical magnitude sensed by both capacitors, the capacitance of one capacitor increases by a certain amount while the capacitance of the other capacitor decreases by the same amount, whereby the natural frequency of the resonance circuit remains unchanged.

15. The combination of claim 1, comprising also an additional unit mounted on the rotor and similar to said first unit, said first and additional units being spaced from each other circumferentially of the rotor and each coacting with said second unit, the sensing members of said first and additional units being located at different distances from the rotor axis.

* * * * *